Dec. 6, 1960  M. P. LEBOURG  2,963,583
WELL LOGGING APPARATUS
Filed Jan. 17, 1955

*INVENTOR.*
MAURICE P. LEBOURG.

BY *Robert Hockfield*

HIS ATTORNEY.

United States Patent Office 2,963,583
Patented Dec. 6, 1960

2,963,583

WELL LOGGING APPARATUS

Maurice P. Lebourg, Houston, Tex., assignor, by mesne assignments, to Schlumberger Well Surveying Corporation, Houston, Tex., a corporation of Texas Filed Jan. 17, 1955, Ser. No. 482,200

9 Claims. (Cl. 250—83.3)

This invention relates to well logging apparatus and, more particularly, pertains to a new and improved radioactivity logging system for obtaining a log of radiant energy emanating under induced conditions from the earth formations traversed by a well or a borehole.

As used herein, the term "radiant energy" is intended to denote either wave or particle energy. Accordingly, gamma rays, neutrons and charged particles are all deemed to be within the scope of the expression "radiant energy." Moreover, "induced radiant energy" is intended to signify radiant energy emanating from a material in response to incident radiant energy. Such phenomena as the generation of gamma rays by the material as a result of bombardment by and the capture of incident neutrons, and the production of slowed or lower energy neutrons caused by the elastic collisions of incident neutrons with particles of the material are considered exemplary of "induced radiant energy."

One variety of radioactivity well logging apparatus presently in use includes a source for irradiating the earth formations with neutrons, some of which are slowed and captured thereby inducing gamma radiation. The apparatus also includes a gamma ray detector, and by continuously recording the counts per unit time of the detector output as the equipment traverses the borehole, a useful log providing information regarding certain qualities, such as porosity, of the earth formations is obtained.

The just-described apparatus is generally satisfactory and has met with wide commercial success; however, in some cases the borehole under investigation is filled with a hydrogenous drilling liquid, such as a water-base mud, while in other instances the borehole may be dry. Thus, accurate quantitative data may not always be obtained with a particular instrument since neutrons are slowed and effectively reduced in number while traveling through the hydrogenous material of a mud-filled borehole, and this effect, of course, does not occur in a dry borehole.

It is, therefore, an object of the present invention to provide new and improved well logging apparatus of the radioactivity type affording more accurate quantitative data concerning the earth formations than heretofore possible.

Another object of the present invention is to provide new and improved radioactivity logging apparatus for inducing and measuring radiant energy in the earth formations and in which effects dependent upon the presence or absence of drilling fluid in boreholes under investigation are minimized.

Logging apparatus embodying the present invention is adapted to derive a log of formations traversed by a borehole which may or may not be filled with a liquid. The apparatus comprises a source of radiant energy adapted to be passed through the borehole for irradiating the earth formations thereby to cause the emission of induced radiant energy. A radiant energy detector, spaced from the source in an axial direction relative to the borehole, intercepts induced radiant energy and provides a corresponding electrical signal which may be utilized to obtain a log of the formations. The spacing between the source and the detector in the aforesaid axial direction is adjustable in response to the liquid content of boreholes under investigation.

The novel features of the present invention are set forth with particularity in the appended claims. The present invention, both as to its organization and manner of operation, together with further objects and advantages thereof, may best be understood by reference to the following description taken in connection with the accompanying drawing in which:

Figure 1:
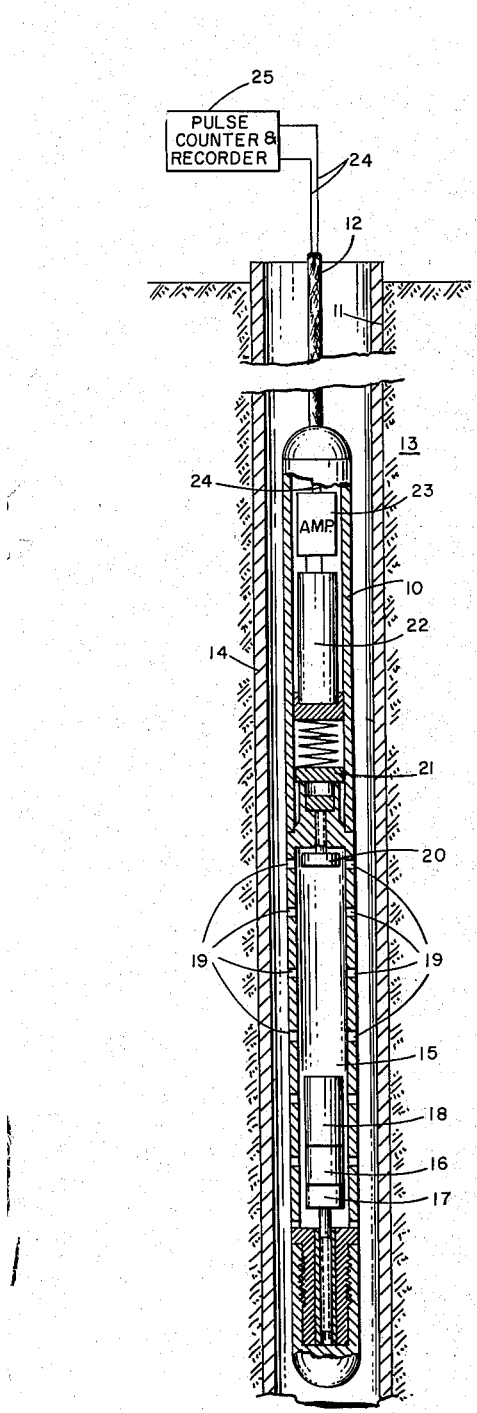
Fig. 1 is a schematic representation, partly in vertical section, of radioactivity logging apparatus constructed in accordance with the invention, shown in one condition of operation in a borehole.

In Fig. 1 of the drawing there is shown radioactivity well logging apparatus constructed in accordance with the present invention and including a housing 10 supported in a borehole 11 by a cable 12 which may be used in cooperation with a winch (not shown) to lower and raise housing 10 in the usual manner. Borehole 11 traverses earth formations 13 and may be uncased, or provided with a casing 14, as shown.

The lower section of housing 10 defines a guide cylinder 15 and a source of radiant energy 16 is movable within the guide cylinder along the longitudinal axis of housing 10. Source 16 may, for example, comprise a mixture of radium and beryllium functioning in a well-known manner to irradiate formations 13 with neutrons. In one operating condition for the apparatus, as shown in Fig. 1, source 16 is maintained by its own weight against an adjustable stop 17 disposed at the lowermost end of housing 10. Source 16 is mechanically connected to the lower end of a suitable float 18 so that upon the introduction of a fluid via a plurality of openings 19, float 18 carries source 16 upwardly until movement is arrested by a second adjustable stop 20 mounted at the upper end of guide cylinder 15.

A gamma ray shield 21, which may be composed of lead, separates the lower section of housing 10 from an upper, detector section in which a radiant energy detector 22 is supported. The detector 22 may, for example, be a conventional Geiger-Mueller tube, which responds in a well-known manner to radiant energy, such as gamma rays and produces a corresponding electrical signal of pulse wave form.

The electrical signal output of the radiant energy detector 22 is applied to an amplifier 23 which may include suitable pulse-shaping provisions, in turn, connected by electrically insulated leads 24 of cable 12 to a conventional pulse counter and recorder unit 25 located at the surface of the earth. Unit 25, for example, may include a suitable integrator or pulse counter coupled to a recording voltmeter in which the recording medium is displaced in proportion to movement of housing 10 through borehole 11 so that a continuous log may be obtained.

In operation, housing 10 may be lowered into a borehole such as the one illustrated in Fig. 1 having a section which does not contain a drilling fluid. Accordingly, source 16 rests against lower stop 17 as shown. The source emits neutrons which irradiate formations 13. Some of the neutrons are captured by material within the formations and, in response to each such capture, a quantum of gamma radiation is emitted. This induced radiant energy is returned, at least in part, to the housing 10 and some of it impinges upon radiant energy detector 22 and the resulting pulse-type electrical signal is amplified in amplifier 23 before being transmitted over conductors 24 to the pulse counter and recorder unit 26. The pulse counter derives a potential representing the number of pulses occurring per unit time for controlling the recorder and a log of the earth formations traversed by the borehole 11 is derived.

Figures 2, 3:
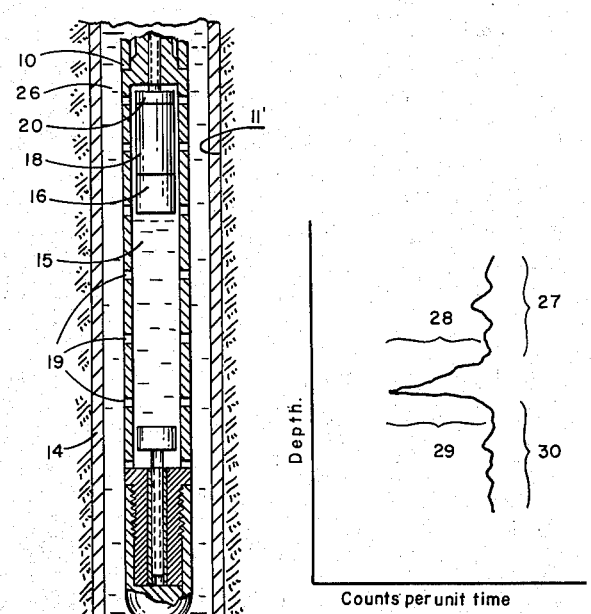
Fig. 2 represents a portion of the apparatus shown in Fig. 1 but illustrates another condition of operation.
Fig. 3 is a graph illustrating a typical log which may be obtained with the apparatus as shown in Figs. 1 and 2.

If the apparatus encounters a section 11' of borehole 11 containing a drilling fluid 26 as shown in Fig. 2, or is introduced into another borehole containing a drilling fluid, as soon as fluid enters guide cylinder 15 via openings 19, the buoyancy of float 18 causes it to rise along the guide cylinder and the float comes to rest against upper stop 20. Thus, the spacing between the source and the detector is decreased in comparison to the spacing illustrated in Fig. 1. For example, in a particular type of equipment, a spacing of twenty-one inches may be employed for a dry hole while a spacing of eighteen inches may be utilized in a borehole filled with drilling fluid, and the stops 17 and 20 are appropriately adjusted for these spacings.

As may be seen in the typical log illustrated in Fig. 3, which is a plot of counts per unit time versus depth, a change in source-detector spacing appear in the record derived by unit 25. In a section of the log identified by numeral 27, a particular sensitivity is obtained for the source-detector spacing provided in a dry borehole as illustrated in Fig. 1. When the equipment encounters drilling liquid 26, as shown in Fig. 2, the sensitivity may tend to decrease, as illustrated by portion 28 of the log. However, because of the action of float 18, the source-detector spacing is decreased and a change in sensitivity indicated by section 29 of the record denotes that the source is properly displaced. Consequently, in the remaining portion of the record, denoted by numeral 30, the effective sensitivity is restored while logging in the portion of the borehole filled with drilling fluid.

It is thus evident that apparatus embodying the present invention minimizes the effects of variations in the contents of boreholes under investigation and is not subject to the deficiencies of certain prior arrangements.

Figure 4:
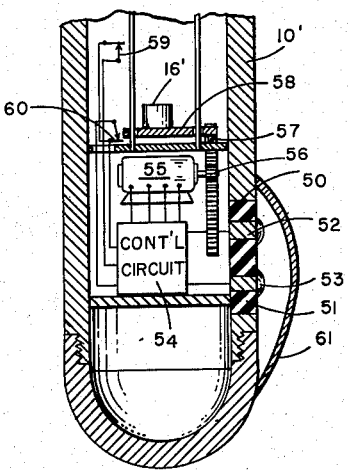
Fig. 4 is a schematic representation, partly in vertical section, of a modified arrangement embodying the invention.

The apparatus illustrated in Fig. 1 may be modified in a manner shown in Fig. 4 to provide an alternative system for varying the source-detector spacing in response to variations in the contents of a borehole under investigation. In the modified apparatus, housing 10' is provided with an opening 50 closed by a member 51 of electrically insulating material. A pair of electrodes 52 and 53 extend through insulator 51 and are connected to a control circuit 54 disposed within the housing. The control circuit, in turn, is connected to a driving motor 55 and controls the direction of rotation of the motor in response to the electrical resistivity of the medium to which electrodes 52 and 53 are exposed. The motor is mechanically connected to a gear 56 having its teeth in meshing engagement with a rack 57 arranged for movement parallel to the longitudinal axis of the housing. At its upper end, rack 57 is connected to a support 58 which carries a source 16' of radiant energy. Upper and lower limit switches 59 and 60 are adjustably mounted to the housing for engagement by support 58 and are electrically connected to control circuit 54. If desired, a bumper 61 of curved configuration may be connected at its ends to housing 10' in a position so as to protect the electrodes 52 and 53.

In operation, when housing 10' is passed through a dry borehole, the electrical resistivity between electrodes 52 and 53 is relatively high and control circuit 54 produces no effect on motor 55 and thus support 58 is maintained in the position shown where it holds limit contacts 60 open. Upon encountering a relatively conductive fluid, the resistivity between electrodes 52 and 53 drops and control circuit 54 energizes motor 55 which rotates in such a direction as to carry support 58 upwardly. This movement continues until the support engages and opens limit contact 59. Thus, the spacing between the detector and source 16' is decreased.

When the housing 10' is again disposed in a dry portion of the borehole, the relative resistivity of the medium to which the contacts 52 and 53 are exposed increases, and control circuit 54 actuates motor 55 so as to drive support 58 downwardly until limit contacts 60 are opened. Accordingly, the source-detector spacing is adjusted in response to variations in the contents of the borehole under investigation.

Although the invention has been described in association with neutron-gamma ray well logging apparatus, it may be suitably applied to other systems. For example, the source may provide neutrons, but the detector may be responsive to neutrons which are slowed to predetermined energy levels by the formations. For this type of apparatus, the spacing between the source and the detector may vary in the same manner described hereinbefore.

Alternatively, in systems wherein a source of gamma rays is provided for irradiating earth formations and the resulting gamma radiation is detected and where the derived counting rate varies in an adverse manner with the fluid content of a borehole, a system similar to that described in connection with Figs. 1 and 2 may be employed.

Of course, in some applications, it may be desirable to increase the source-detector spacing in going from a dry to a mud-filled borehole section. In this case, the source and its float may be movably disposed above the detector.

Although in the illustrations of apparatus embodying the invention the source alone is movable, it is to be understood that it is within the contemplation of the invention to provide a fixed source and a movable detector, or an arrangement in which both the source and detector may be displaced simultaneously to achieve a desired change in spacing.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. Radioactivity well logging apparatus comprising a source of radiant energy adapted to be passed through a borehole for irradiating formations traversed by the borehole and causing the emission of induced radiant energy, a radiant energy detector spaced from said source in an axial direction relative to the borehole and adapted to be moved with said source, and means sensitive to material contained by the borehole for varying the relative spacing between said source and said detector as a function of the contents of the borehole.

2. Radioactivity well logging apparatus comprising a source of radiant energy adapted to be passed through a borehole for irradiating formations traversed by the borehole and causing the emission of induced radiant energy, a radiant energy detector adapted to be moved with said source, said source and said detector being movable with respect to one another substantially along the axis of the borehole between a first relative spacing and a second relative spacing larger than said first relative spacing, and means sensitive to material contained by the borehole for displacing said source and said detector relative to one another between said first and said second relative spacings as a function of the contents of the borehole.

3. Radioactivity well logging apparatus comprising a source of radiant energy adapted to be passed through a borehole for irradiating formations traversed by the borehole and causing the emission of induced radiant energy, a radiant energy detector adapted to be moved with said source, said source and said detector being movable with respect to one another substantially along the axis of the borehole between a first relative spacing and a second relative spacing larger than said first relative spacing, and means sensitive to material contained by the borehole for displacing said source and said detector relative to one another between said first and said second relative spacings as a function of the contents of the borehole so that said first relative spacing occurs in a borehole section containing a liquid and said second relative spacing occurs in a relatively empty borehole section.

4. Radioactivity well logging apparatus for use in a borehole which may or may not contain a liquid comprising a support adapted to be lowered through the borehole, and having a longitudinal axis substantially parallel to the axis of the borehole, a source of radiant energy for irradiating the formations traversed by the borehole mounted to said support for movement along said longitudinal axis, a radiant energy detector fixed to said support in spaced relation from said source along said longitudinal axis and responsive to induced radiant energy emitted by the formations in response to irradiation by said source, and means sensitive to material contained by the borehole for displacing said source relative to said support thereby to change the spacing between said source and said detector as a function of the contents of the borehole.

5. Radioactivity well logging apparatus for use in a borehole which may or may not contain a liquid comprising a support adapted to be lowered through the borehole, and having a longitudinal axis substantially parallel to the axis of the borehole, a source of radiant energy for irradiating the formations traversed by the borehole mounted to said support for movement along said longitudinal axis, a radiant energy detector fixed to said support in spaced relation from said source along said longitudinal axis and responsive to induced radiant energy emitted by the formations in response to irradiation from said source, and said source being buoyant in a liquid which may be encountered in the borehole and being exposed to the contents of the borehole thereby to vary the relative spacing between said source and said detector as a function of the liquid content of the borehole.

6. Radioactivity well logging apparatus for use in a borehole which may or may not contain a liquid comprising a support adapted to be lowered through the borehole, and having a longitudinal axis substantially parallel to the axis of the borehole, a source of radiant energy for irradiating the formations traversed by the borehole mounted to said support for movement along said longitudinal axis, a radiant energy detector responsive to induced radiant energy emitted by the formations as a result of irradiation by the source fixed to said support in spaced relation above said source along said longitudinal axis, and a float mechanically connected to said source and exposed to the contents of the borehole for varying the relative spacing between said source and said detector as a function of the liquid content of the borehole.

7. Radioactivity well logging apparatus for use in a borehole which may or may not contain a liquid comprising a source of radiant energy adapted to be lowered through the borehole for irradiating earth formations traversed by the borehole and causing the emission of induced radiant energy, a radiant energy detector spaced from said source in an axial direction relative to the borehole and adapted to be moved with said source, and means responsive to an electrical characteristic of the contents of the borehole for varying the relative spacing between said source and said detector.

8. Radioactivity well logging apparatus for use in a borehole which may or may not contain a liquid comprising a source of radiant energy adapted to be lowered through the borehole for irradiating earth formations traversed by the borehole and causing the emission of induced radiant energy, a radiant energy detector spaced from said source in an axial direction relative to the borehole and adapted to be moved with said source, a driving motor for varying the relative spacing between said source and said detector, a control circuit electrically coupled to said driving motor for governing the direction in which said relative spacing is varied, and electrode means exposed to the contents of the borehole and electrically coupled to said control circuit for operating said control circuit so as to regulate said driving motor and vary the relative spacing between said source and said detector as a function of the electrical characteristic of the contents of the borehole.

9. Radioactivity well logging apparatus for use in a borehole which may or may not contain a liquid comprising a support adapted to be lowered through the borehole and having a longitudinal axis substantially parallel to the axis of the borehole, a source of radiant energy for irradiating the formations traversed by the borehole mounted on said support for movement therewith, a radiant energy detector responsive to induced radiant energy emitted by the formations as a result of irradiation by said source mounted on said support for movement therewith in spaced relation to said source along said longitudinal axis, one of said source and said detector being movable along said longitudinal axis, and a float mechanically connected to said one and exposed to the contents of the borehole for varying the relative spacing between said source and said detector as a function of the liquid content of the borehole.

References Cited in the file of this patent

UNITED STATES PATENTS

| | | |
|---|---|---|
| 2,358,619 | Pontecorvo | July 11, 1944 |
| 2,508,772 | Pontecorvo | May 23, 1950 |
| 2,515,500 | Fearon et al. | July 18, 1950 |
| 2,648,778 | Silverman et al. | Aug. 11, 1953 |
| 2,692,949 | MacKnight | Oct. 26, 1954 |
| 2,725,486 | Walstrom | Nov. 29, 1955 |